United States Patent [19]

Barin et al.

[11] Patent Number: 4,497,780
[45] Date of Patent: Feb. 5, 1985

[54] METHOD AND APPARATUS FOR REMOVING ARSENIC FROM AN ARSENIC-CONTAINING MATERIAL

[75] Inventors: Ihsan Barin, Aachen-Lau; Michael Gamroth, Cologne, both of Fed. Rep. of Germany; Rolf Hesse, Mexico City, Mexico; Soegianto Wirosoedirdio, Cologne, Fed. Rep. of Germany

[73] Assignee: Klockner-Humboldt-Deutz AG, Fed. Rep. of Germany

[21] Appl. No.: 546,647

[22] Filed: Nov. 1, 1983

Related U.S. Application Data

[63] Continuation of Ser. No. 230,429, Feb. 2, 1981, abandoned.

[30] Foreign Application Priority Data

Feb. 1, 1980 [DE] Fed. Rep. of Germany ....... 3003635

[51] Int. Cl.$^3$ .................... C01B 27/00; C01B 29/00
[52] U.S. Cl. .................... 423/88; 422/139; 423/87; 423/561 R; 423/565
[58] Field of Search .................... 423/87, 88, 561, 565

[56] References Cited

U.S. PATENT DOCUMENTS

| | | | |
|---|---|---|---|
| 486,330 | 11/1892 | Flury | 423/88 |
| 679,330 | 7/1901 | Petersson | 423/88 |
| 1,790,088 | 1/1931 | Brennan | 423/88 |
| 1,917,725 | 7/1933 | Lenander | 423/88 |
| 2,238,194 | 4/1941 | Tainton | 423/88 |
| 2,867,526 | 1/1959 | Heath et al. | 423/88 |
| 3,220,796 | 11/1965 | Espinosa | 423/88 |
| 4,083,924 | 4/1978 | Styring | 423/88 |

FOREIGN PATENT DOCUMENTS 0023770 of 1894 United Kingdom .................. 423/88

*Primary Examiner*—John Doll
*Assistant Examiner*—Wayne A. Langel
*Attorney, Agent, or Firm*—Hill, Van Santen, Steadman & Simpson

[57] ABSTRACT

Method and apparatus for the removal of arsenic compounds from an arsenic-containing material wherein the material is reacted with an oxygen carrier and a sulfur carrier under temperature conditions sufficiently high to convert the arsenic compounds to sulfides and the arsenic sulfides are thereupon condensed and deposited in solid form.

4 Claims, 3 Drawing Figures

METHOD AND APPARATUS FOR REMOVING ARSENIC FROM AN ARSENIC-CONTAINING MATERIAL

This application is a continuation of application Ser. No. 230,429, filed Feb. 2, 1981, now abandoned.

BACKGROUND OF THE INVENTION

1. Field of the Invention

This invention is in the field of treating arsenic-bearing materials such as tin or other metal ores which involves reacting the material to form a specific type of arsenic sulfide controlled conditions and then condensing the sulfide so produced to remove it from the system without polluting the surrounding environment.

2. Description of the Prior Art

In the processing of arsenic-containing ores, it is necessary for metallurgical reasons to separate the arsenic from the metals or other intermediate products to be obtained. After initial separation of the arsenic, usually in the gas phase in the form of arsenic oxide, an additional step is necessary in order to either obtain the arsenic in the form of a metal arsenide or, for reasons of keeping the environment clean, to convert it into a disposable, harmless or non-toxic end product.

Due to increased demands regarding the environment, measures must be taken on existing metallurgical systems and those which are to be newly constructed, to guarantee a complete and as selective as possible a separation of the arsenic and other toxic materials. These measures are particularly necessary in view of the extension of raw material sources into ores or other raw materials which because of their high arsenic concentrations present technical difficulties.

In the case of removing arsenic during calcining and reduction of heavy metal ores, the arsenic is volatilized into a gas phase predominantly in the oxide form as $As_4O_6$, and is then either partially condensed as $As_2O_3$ or dissolved in an aqueous phase. This is followed by the precipitation of the arsenic in the form of an arsenate, most frequently in the form of calcium arsenate or iron arsenate. The condensation of arsenic-containing vapors leads to the formation of liquid layers which may lead to clogging in the exhaust gas conduction system. The removal of arsenic-oxide-deposits from filter systems and exhaust gas pipes is dangerous to the health of operating personnel and is very costly. The calcium arsenates which are formed by treating the arsenic-containing washing liquid with milk of lime exhibit solubilities in water of about 0.1 to 0.3% which is far above the maximum required for keeping the environment clean.

In German AS No. 19 34 440 there is described a method for the removal of arsenic and non-ferrous metals from calcined pyrites which involves a partial reduction of the roasted material by means of a carbonaceous fuel and air, a subsequent chlorination of the thus treated hot ores in a fluid bed reactor with a gas mixture consisting of chlorine, oxygen, and an inert gas for 30 to 120 minutes at a temperature of 650° to 950° C. The gas employed for the purpose of chlorination contains an oxygen concentration of greater than 3% by volume. After the chlorination, the soluble arsenate remains in the solid particles. The gas phase exhibits volatilized trivalent arsenic oxide and trivalent arsenic chloride which are then removed by a wash water which nevertheless contains a high percentage of the arsenic compounds.

SUMMARY OF THE INVENTION

The present invention provides a method for removal of arsenic from arsenic-containing materials whereby the arsenic is separated from the metals to be obtained through volatilization and is converted into water-insoluble products which are disposable and are non-toxic. This objective is achieved by means of reacting the material in a reactor with controlled oxygen and sulfur potentials at increased temperatures thereby converting the arsenic materials into arsenic sulfides ($As_4S_4$) which are condensed in an additional method step.

The conversion of arsenic into arsenic sulfides ($As_4S_4$) is particularly desirable since these products are water-insoluble, non-toxic, and thereby disposable. The conversion is preferably conducted in the gas phase whereby high reaction rates can be obtained together with a capability of precisely adjusting the reaction conditions with respect to the required oxygen and sulfur potentials, and also with respect to a homogeneous operating temperature.

In a preferred embodiment of the present invention, the thermodynamic stability range of the arsenic sulfide ($As_4S_4$) is maintained through adjustment of the corresponding oxygen and sulfur potentials at a temperature of between 900° and 1200° K. It has been shown that the exhaust gases of metallurgical and other systems such as multiple hearth roasters, revolving kilns, melting cyclones, and other combustion chambers in which arsenic-containing materials are processed can be economically converted to arsenic sulfides in the stable range by suitable adjustment of the sulfur, hydrogen, carbon, and oxygen carriers for the adjustment of the required oxygen and sulfur potentials.

In one embodiment of the present invention, elementary sulfur or metallic sulfides are employed as the sulfur carriers whereby the sulfur carrier reacts with air in a predetermined quantity in a sulfur burner. The oxygen potential is adjusted through partial combustion of a carbonaceous fuel with air in an additional burner. This expedient makes it possible, in the simplest fashion, to adjust the oxygen and sulfur potentials necessary for the conversion of the arsenic compounds in the gas phase.

In an additional preferred embodiment according to the present invention, the arsenic sulfides are selectively condensed and deposited in solid form by means of indirect and/or direct cooling. The formed arsenic sulfides can be condensed through suitable variation of the gas composition and of the temperature profile. Depending on the desired further utilization of the end product, indirect cooling such as by means of a water cooled jacket can be conducted as suitably as a direct cooling, for example, by introduction of the arsenic sulfides in the gaseous phase into water or an aqueous solution or into contact with another cooling agent.

In the case of exhaust gases with a relatively high oxygen potential, the arsenic compound subsequent to removal of sulfur dioxide with milk of lime, can also be precipitated and separated from the aqueous solution in the form of arsenic sulfide through the addition of suitable sulfur carriers such as hydrogen sulfide, sodium sulfide, or the like.

A selective separation of the arsenic sulfides can be effected in the simplest fashion through the utilization of several reactors whereby it is possible to operate with different gas compositions or temperatures with regard to the selective separation of the arsenic sulfides from sulfides and oxides of other metals such as lead sulfide.

In a further embodiment of the invention, air or water is used as the coolant. A direct cooling by means of water is a possible expedient since in accordance with the present invention, the formed solid arsenic sulfides are non-toxic and water insoluble.

In a further development of the present invention, the arsenic sulfides can be passed into a cooler designed in the form of a washing column or absorption column whereby the arsenic sulfides are captured in the washing water, subsequently separated, and deposited. The washing water is then maintained in continuous circulation. A washing cooler of this type effects the necessary cooling of the arsenic sulfides in the simplest manner, requiring only the continuous recirculation of the washing water. Since the water is relatively low in corrosion, additions to the washing water are usually not necessary.

In a preferred embodiment of the invention, in order to convert the arsenic into arsenic sulfides, suitable catalysts, including inert materials, can be employed. The use of catalysts renders possible high reaction or conversion speeds and guarantees the completeness of the reaction.

In one embodiment of the invention, the reactor is connected with a cooler by means of a gas outlet line and the reactor contains a gas supply line, a sulfur burner, an additional fuel burner, as well as a discharge for collecting airborne dust. With the design of the apparatus described for carrying out the method according to this invention, it is possible to change over or readapt the entire method in existing systems with a low cost outlay in order to bring about the environmentally compatible features of the present invention.

In a further embodiment of the present invention, it is also advantageous in the case where several reactors are used that at least one reactor be in the form of a conduit reactor or a fluidized bed reactor. The chemical conversions are thereby favored and are rendered readily controllable. In addition, the supply of inert materials and gaseous and fluid catalysts and their homogeneous distribution throughout the reaction system is rendered possible in a particularly simple fashion.

BRIEF DESCRIPTION OF THE DRAWINGS

Further details, features and advantages of the invention will be apparent from the following description of a sample embodiment for carrying out the method according to the invention, which is schematically illustrated in the drawings as well as in the phase diagrams.

Turning to FIG. 1, there is shown a system for carrying out the method according to the present invention including a multiple hearth roaster 1, a reactor 2, and a cooler 3 which are connected with one another by means of gas lines 4 and 5.

Figure 1:
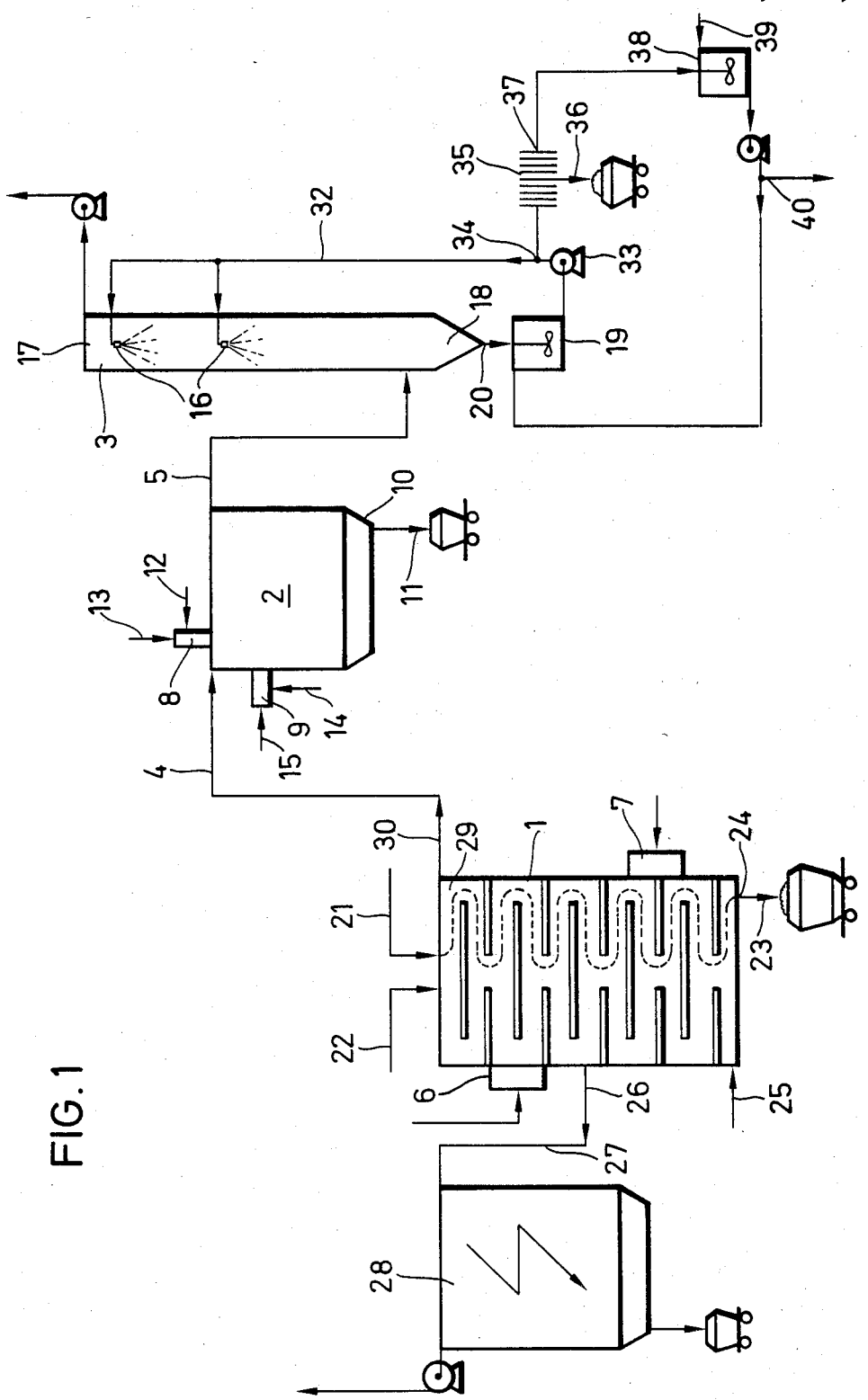
FIG. 1 illustrates a system for removing arsenic during calcination of tin ore concentrates.

The multiple hearth roaster 1 has eleven stages whereby in the region of the upper five stages, a reduction burner 6 is positioned and in the region of the lower stages, an oxidation burner 7 is positioned. The reactor 2 is connected with the cooler 3 by means of the gas outlet line 5. The reactor 2 is provided with a gas supply line 4, a sulfur burner 8, an additional burner 9, as well as a discharge trap 10 for collecting airborne dust and discharging it through a line 11. The sulfur burner 8 has a supply line 12 for pulverized or gaseous sulfur carriers such as elemental sulfur, hydrogen sulfide, ferrous sulfide, iron pyrites and the like, as well as a supply line 13 for oxygen carriers. The additional burner 9 is provided with a fuel inlet 14 and oxygen inlet 15. The cooler 3 contains several spray devices 16 as well as a gas outlet 17 and a funnel-shaped liquid outlet 18 which is connected with a plastic-coated agitating receptacle 19 by means of a pipeline 20.

Figure 2:
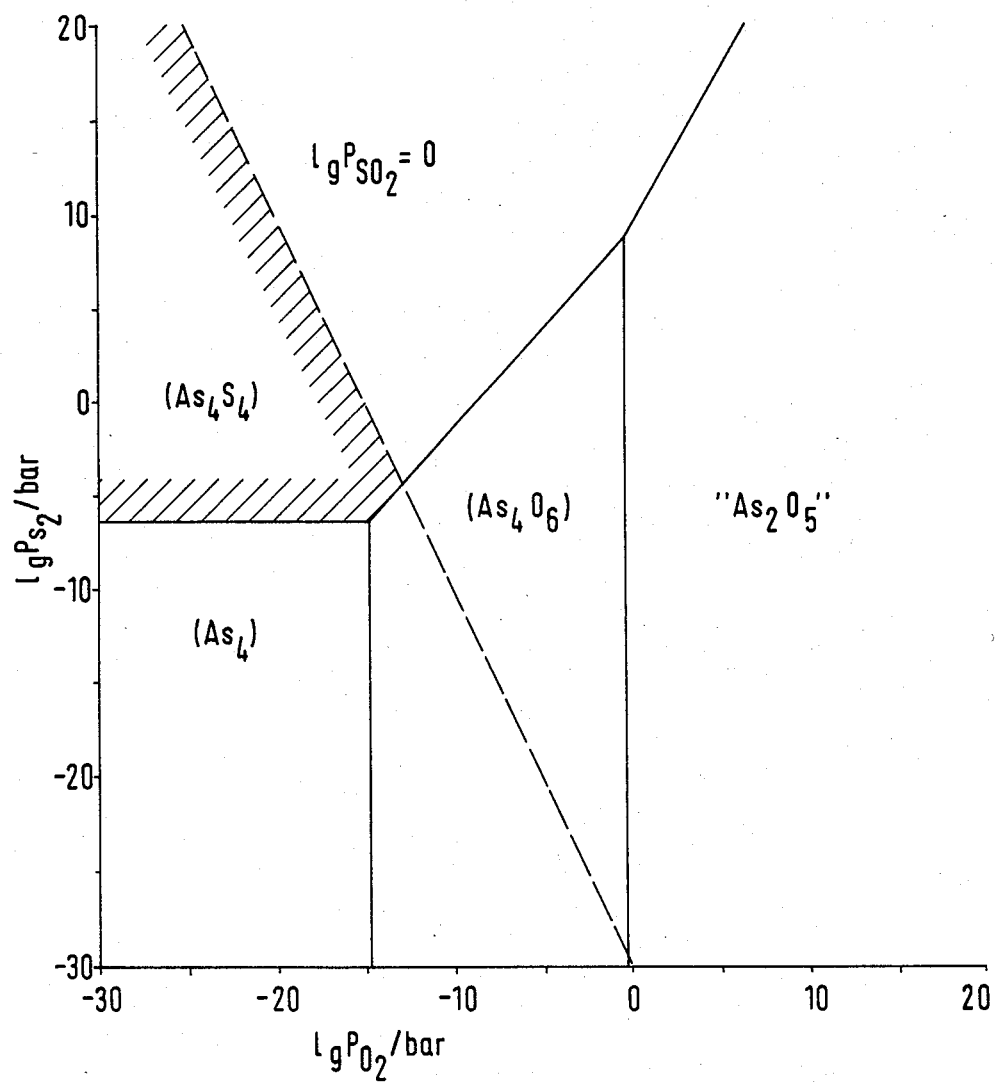
FIG. 2 illustrates a phase diagram of the stability range of arsenic sulfide ($As_4S_4$) in the system As-O-S at a temperature of 1,000° K.

During operation of the system shown in FIG. 1, the arsenic containing material such as tin ore concentrates are introduced by means of a line 21 into the roaster where they are combined with carbon entering in an inlet line 22. The concentrate and the carbon pass through the individual stages whereby the various chemical reactions are carried out of completion. The discharge of the oxidic end product 23 proceeds by means of a material discharge line 24. The gas atmosphere exhibits an oxidizing composition in the lower region of the multiple hearth roaster 1 and is regulated or controlled by the supply of air through a line 25 with the aid of the oxidation burner 7. The resulting gases are partially removed from the roaster by means of an outlet 26 and supplied by means of a line 27 to an electrofilter 28 for the purpose of cleaning the gas. A portion of the gas reaches the upper stages of the multiple hearth roaster 1 where, with the aid of the reduction burner 6, a reducing atmosphere is adjusted at a temperature of, for example, 1,000° to 1,100° K. corresponding to the stability range of the compounds $As_4S_4$ or $As_4$, respectively, according to the phase diagram of FIG. 2. An exhaust gas is collected in space 29 consisting mainly of $As_4$, and leaves the multiple hearth roaster 1 by means of an outlet of an outlet 30 where it reaches the reactor 2 by means of the gas supply line 4. Depending on the quantity of arsenic in the exhaust gas, specific quantities of sulfur, fuel and oxygen carriers are supplied to the reactor 2 by means of the sulfur burner 8 and the additional burner 9 so that an oxygen and sulfur potential is achieved at the selected operating temperature in accordance with the stability range of arsenic sulfide ($As_4S_4$). Most of the arsenic-containing materials, which are converted into arsenic sulfides in the reactor 2 reach the cooler 3 by means of gas outlet line 5. A cooling of the arsenic sulfides takes place by means of a circulating washing liquid from a line 32 which is introduced into the cooler by means of the spray devices 16 and which leaves the cooler 3 jointly with the solid arsenic sulfides ($As_2S_3$) by means of the funnel-shaped liquid outlet 18 and enters the agitator receptacle 19. The washing fluid is conducted in continuous circulation by means of a pump 33. A removal device 34 is provided to treat the washing fluid in the line 32 from time to time where it is supplied to a filter press 35 in which the arsenic sulfides are separated and eliminated as a filter residue discharged through a line 36. The filtrate is supplied by means of a line 37 to an agitator receptacle 38 into which additional milk of lime is introduced by means of a line 39 to neutralize the filtrate so that neutral water can be withdrawn from the system by means of a line 40.

A tin ore concentrate having the following composition, in percent by weight, can be calcined:

| | |
|---|---|
| Sn = | 50.0% |
| As = | 4.0% |
| S = | 7.5% |
| Sb = | 0.1% |
| Pb = | 0.2% |
| Fe = | 8.5% |
| $SiO_2$ = | 14.0% |
| $Al_2O_3$ = | 2.0% |

If the feed quantity amounts to 48 tons per day, a coal quantity of 1.5 tons per day is required.

The calcining of this ore is so conducted that the arsenic in the multiple hearth roaster 1 is completely converted into $As_4$ vapor. This takes place in the upper five stages of the multiple hearth roaster 1 illustrated in FIG. 1 under reducing conditions at a temperature of approximately 1,000° K. and an oxygen partial pressure of approximately $10^{-16}$ bar. In the lower stages of the multiple hearth roaster 1, the calcining is so conducted that the remaining sulfide compounds, in particular SnS, are completely oxidized. The exhaust gas removed from the upper reduction section is fed to the reactor 2 in which, at a temperature of 1,000° K., the composition of the gas phase is continuously maintained by means of the sulfur burner 8 and the additional burner 9. The gas phase (without $As_4S_4$) in the reactor 2 has the following composition in percent by volume:

| | |
|---|---|
| $N_2$ = | 74 to 75 |
| $CO_2$ = | 16.0 |
| CO = | 0.05 |
| $SO_2$ = | 5.0 |
| $H_2O$ = | 4.0 |
| $H_2$ = | 0.02 |

This gas composition corresponds to a sulfur partial pressure of $10^{-2}$ bar and an oxygen partial pressure of $10^{-16}$ bar.

Figure 3:
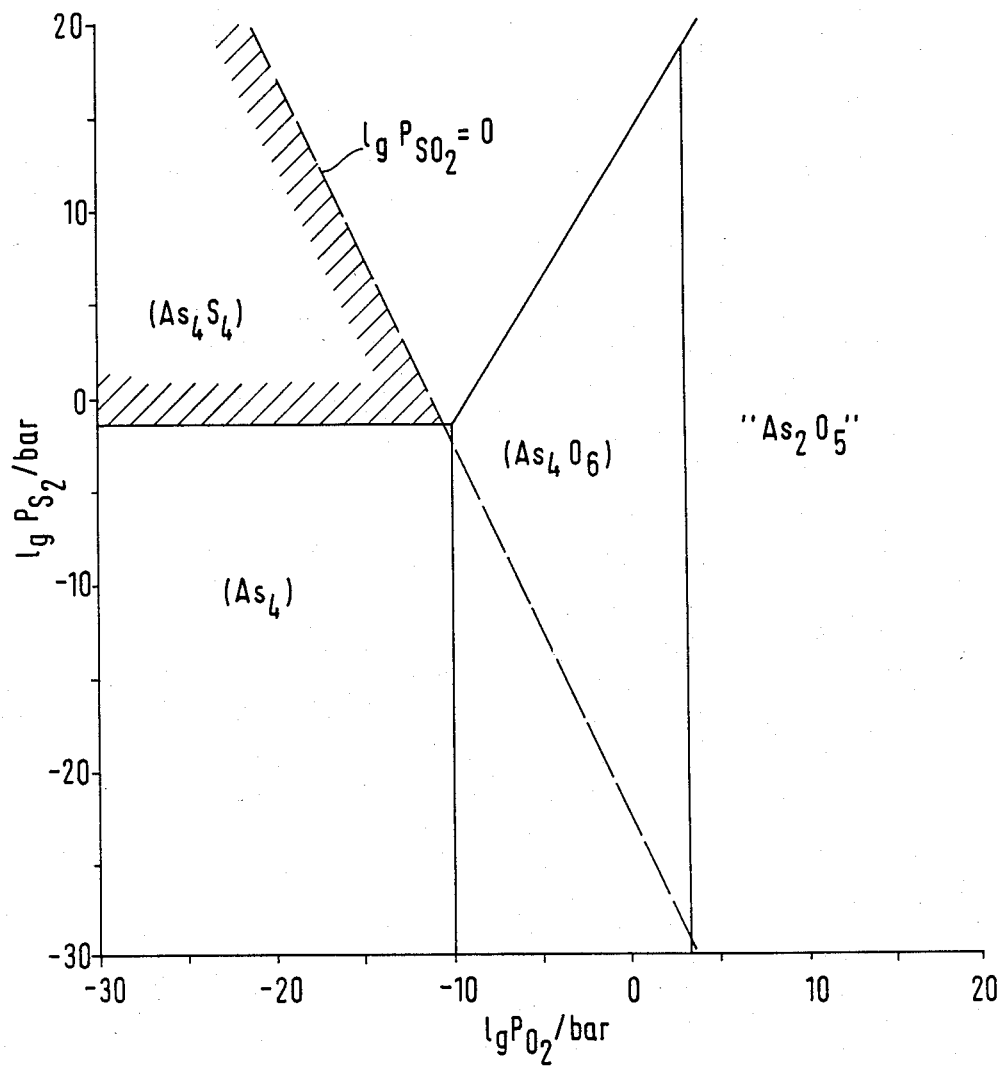
FIG. 3 illustrates a phase diagram of the stability range of arsenic sulfide ($As_4S_4$) in the system As-O-S at a temperature of 1,273° K.

The above example describes only one gas composition and operating temperature which can be used in accordance with the present invention. From the phase diagrams of FIGS. 2 and 3, it is possible to determine the operating temperatures of the gas compositions in the reactor which are to be adjusted so as to achieve operation in the stability range of arsenic sulfide ($As_4S_4$) as well as the equilibrium line for $SO_2$ at $P_{SO_2}=1$ bar. The abscissa in these phase diagrams is the decimal logarithm of the oxygen partial pressure, and the ordinates represent the decimal logarithm of the sulfur partial pressure.

It should be evident that various modifications can be made to the described embodiments without departing from the scope of the present invention.

We claim as our invention:

1. A method for the removal of arsenic compounds from an arsenic-containing material which comprises:

calcining said arsenic-containing material in the presence of carbon in a reducing atmosphere to drive off a gas consisting mainly of $As_4$, delivering the gaseous $As_4$ into a reaction space, introducing controlled amounts of a sulfur carrier with oxygen and a carbon carrier with oxygen into said reaction space, maintaining a temperature between 900° and 1200° K. in said reaction space with oxygen potentials and sulfur potentials therein leading to the reaction of $As_4$ in a gas/gas reaction to form $As_4S_4$, cooling the gaseous $As_4S_4$ in a cooling zone by contact with a wash water to form a solid arsenic sulfide ($As_2S_3$) concentrate which precipitates in said wash water, filtering out the precipitated arsenic sulfide from the wash water, and chemically neutralizing the separated wash water.

2. A method according to claim 1 in which:

said neutralizing is carried out by treatment with milk of lime.

3. A method according to claim 1 wherein:

said arsenic-containing material is a tin ore concentrate.

4. A method according to claim 1 wherein said sulfur carrier is elemental sulfur, hydrogen sulfide, ferrous sulfide, or iron pyrites.

* * * * *